United States Patent
van Oldenborgh et al.

(10) Patent No.: US 6,751,237 B2
(45) Date of Patent: Jun. 15, 2004

(54) METHOD, DEVICE AND SOFTWARE FOR DIGITAL INVERSE MULTIPLEXING

(75) Inventors: Marc van Oldenborgh, Amsterdam (NL); Martijn Gnirrep, Amsterdam (NL)

(73) Assignee: Nonend Inventions N.V., Curacao (NL)

( * ) Notice: Subject to any disclaimer, the term of this patent is extended or adjusted under 35 U.S.C. 154(b) by 285 days.

(21) Appl. No.: 10/085,225

(22) Filed: Feb. 27, 2002

(65) Prior Publication Data

US 2003/0016703 A1 Jan. 23, 2003

(30) Foreign Application Priority Data

Jul. 4, 2001 (NL) .............................. 1018463

(51) Int. Cl.$^7$ .............................................. H04Q 11/00
(52) U.S. Cl. ...................................... 370/535; 704/201
(58) Field of Search ................................ 370/535, 537, 370/229, 230, 231, 232, 233, 234, 235, 236, 468, 389, 465, 428, 411, 254, 256, 406, 407, 408, 409, 216; 704/201; 714/701

(56) References Cited

U.S. PATENT DOCUMENTS 6,339,756 B1 * 1/2002 Hinderks .................... 704/201
6,415,398 B1 * 7/2002 Kikuchi et al. ............. 714/701

OTHER PUBLICATIONS

IEEE Internation Conference on Communications, Jun. 16–18, 1975, pp. 41–10–41–13, New York, pp. 41–10.
IEEE Transactions on Commications, vol. 41, No. 11, Nov. 1993, pp. 1677–1686.
EEE International Workshop on Network and Operating Systems Support for Digital Audio and Video, pp. 13–23.

* cited by examiner

Primary Examiner—Dang Ton
(74) Attorney, Agent, or Firm—Blakely, Sokoloff, Taylor & Zafman

(57) ABSTRACT

The invention relates to a method, a device and software for digital inverse multiplexing digital data, wherein a packet of digital data is split into:

a first flow wherein the packet of digital data is sent from front to rear;

a second flow wherein the packet of digital data is sent from rear to front, and;

a third flow, consisting of a flow of data elements obtained from each time a first data element of the digital data from the rear part of the front subarea of the packet and a second data element of the digital data from the front part of the rear subarea of the packet that are reduced into one third data element by means of a reversible operation.

Such a method, device and software can be used in cordless telephones, computer networks, such among others the internet, and other networks of devices in which digital data are exchanged.

45 Claims, 9 Drawing Sheets

METHOD, DEVICE AND SOFTWARE FOR DIGITAL INVERSE MULTIPLEXING

FIELD OF THE INVENTION

The invention relates to a method, a device and software for digital inverse multiplexing digital data.

BACKGROUND OF THE INVENTION

In practice very many methods are know to send digital data, particularly digital data through a network. An example are digital data that are sent through the internet, but also digital telephone signals, such as for instance in case of cordless GSM telephones.

In practice also various methods and devices are known for inverse multiplexing digital data.

The data are sent in the form of data packets via a medium. This can take place via a physical cabling in for instance copper or glass fibre, or cordless, for instance via infrared or radio waves.

Because the capacity of data transfer, often coupled to bandwidth, of the media over which the data are sent is mostly too small, the data are often compacted. However, this has often appeared not to be sufficient.

Additionally many of these methods are aimed at optimising the data transfer between two computers. Moreover, many techniques require an overhead, and are not always as robust regarding the errors or failures of lines and other malfunctions.

SUMMARY OF THE INVENTION

It is among others an object of the present invention to at least partially solve these problems. To that end the invention provides a method for digital inverse multiplexing digital data, wherein a packet of digital data is split into:
  a first flow wherein the packet of digital data is sent from front to rear;
  a second flow wherein the packet of digital data is sent from rear to front, and;
  a third flow, consisting of a flow of data elements obtained from each time a first data element of the packet of digital data from the rear part of the front subarea of the packet and a second data element of the packet of digital data from the front part of the rear subarea of the packet that are reduced into one third data element by means of a reversible operation.

Additionally the invention provides a device for sending a packet of digital data consisting of data elements, comprising:
  a transmission module, adapted for transmitting the data elements;
  a memory module, adapted for storage of the packet of digital data;
  a reading module, adapted for reading each time two data elements from two parts of the memory module, one data element from the rear part of the front subarea of the packet, and one data element from the front part of the rear subarea of the packet;
  an operator, adapted for converting said two data elements into one data element to be transmitted, and
  a construction module, adapted for receiving the data elements of the reading module, supplying the data elements to the operator, and receiving the resulting data element from the operator and supplying the data element to the transmission module.

Additionally the invention provides a device for receiving a packet of digital data consisting of data elements, comprising:
  a receiving module, adapted for receiving at least three flows of data elements;
  a memory module, adapted for storage of the data elements;
  an operator, adapted for converting two data elements in one data element;
  a counting module, adapted for tallying the quantity of data elements that have been received from each flow;
  a decision module, adapted for determining whether all data elements that are necessary for reconstructing the complete packet of digital data are present and to determine which part of the packet has to be determined by means of reconstruction, and
  a reconstruction module for retrieving each time two data elements from the memory means, which is connected to the operator for supplying said data elements to the operator, discharging the resulting data element of the operator and writing the resulting data element to the memory module.

Additionally the invention provides software for receiving a packet of digital data that is sent in at least three flows of data elements, comprising:
  a writing routine for writing the data elements of the flows of data elements to the memory means;
  a counting module for tallying the quantity of data elements that have been received from each flow;
  a decision routine for determining whether all data elements that are necessary for reconstructing the complete packet of digital data are present and to determine which part of the packet has to be determined by means of reconstruction;
  an operator routine for converting two data elements into one data element, and
  a reconstruction routine for retrieving each time two data elements from the memory means, for supplying said data elements to the operator routine, for discharging the resulting data element from the operator routine and writing the resulting data element to the memory means.

By splitting the data flow in several flows, wherein a first flow starts sending the data from the front and works its way to the rear, the second flow works from the rear to the front, and at least one third flow according to the invention is defined, the possibility is given to very quickly send data between and to for instance computers. Additionally, because of the specific way in which the flows are compiled it is not necessary to let others than the transmitter(s) and receivers communicate with each other. Possible different transmitter(s) do need not communicate with each other. Additionally no complex data processing is necessary to for instance tally when all data have been received.

Moreover, it is possible as a result of the invention to realise a fast and robust data transfer of a low overhead, also because a third check signal is compiled from the data.

In many cases the data connection is a-symmetrical: the transfer capacity is smaller than the receiving capacity. In the method according to the invention, the entire receiving capacity can be used despite the smaller transmission capacity. This may for instance be of importance in so-called streaming broadcasts through the internet, wherein through the internet digital radio broadcasts and in the future even television or video can take place. The data flows can also enter via various lines. For instance one data flow can for example enter via a telephone line, and another data flow via a cable, the electricity grit or cordless via GSM. It is also possible to let the data flows enter via one cable by means of physical multiplexing. The invention therefore actually offers a specific form of digital inverse multiplexing.

Inverse multiplexing according to the invention can take place at different levels, at micro level and at macro level, or simultaneously at different levels. A possible micro level is bit level. A possible macro level is the level of data packets that are merged into data at receipt, as known from connections that run via the internet.

In an embodiment of the method consecutive first data elements from the rear part of the front subarea are selected from rear to front. As a result even less overhead and control is necessary. In an embodiment thereof or of the method according to the invention consecutive second data elements from the front part of the rear subarea are selected from front to rear, which once more considerably simplifies the control. In an embodiment each time an immediately following data element is selected.

In one of the preceding methods the packet of digital data, if necessary supplemented to a packet that can be split into two equal parts, can be split into two equal sized parts. As a result fewer positions have to be tallied, and a simple method can be guaranteed.

In one of the preceding methods the first and second data elements are bits of the packet of digital data, and the third data element is the result of a single binary operation, preferably an XOR operation, on the first data element and the second data element. By means of a simple, reversible binary operation a quick and simple method can be realised.

In a embodiment according to any one of the preceding methods, the data elements of the first, second and third flow, respectively, are placed in a first, second and third data buffer, respectively. Thus the data buffers can have the size of half the packet of digital data. In this way a simple method can be realised with minimal memory means and control.

In another embodiment of the method the data elements of the first, second and third flow, respectively, are placed in one data buffer having the size of the packet of digital data. In this way optimal use is made of memory means available. In said embodiment the first flow can fill the data buffer from front to rear, the second flow can fill the data buffer from rear to front, and the third flow is duplicated, wherein one duplicated flow fills the data buffer from the middle to the front, and the other duplicated flow fills the data buffer from the middle to the rear. As a result very simple implementation is possible.

In another embodiment the data elements of the first and second flow are placed in a first data buffer, wherein the first flow fills the data buffer from front to rear, and the second flow fills the data buffer from rear to front, and the data elements of the third flow are placed in a second data buffer. This is for instance advantageous when the first or second flow are very fast. It is simply possible then to let that flow run beyond the half.

In an embodiment of a method as described above, either the first or the second flow can overwrite data elements already present in the data buffer originating from the third flow.

In an embodiment of the method a first, second or third device, respectively, sends the first, second and third flow, respectively, to a fourth device. The fourth device can send a signal to the first, second and third device when either the data buffer is full or the respective data buffers are full, or stops sending receipt confirmations as soon as the data buffer is full or the respective data buffers are full.

In a possible embodiment, for instance when transmitting or receiving streaming internet content or other sequential signals, the flows are almost simultaneously sent.

An embodiment of the method described above relates to a method wherein a transmitting device sends the first, second and third flow to a first, second and third receiving device, respectively, and wherein the first, second and third receiving device forward their respective flows to the other two receiving devices.

Additionally the invention relates to a method for sending a packet of digital data to a first device in an organic data network, wherein at least two transmitting devices in the data network simultaneously send complementary data packets to the first device and a third transmitting data device sends data packets to the first device that have been obtained from each time a first data element from the rear part of the front subarea of the packet and the second data element from the front part of the rear subarea of the packet which by means of a reversible operation have been reduced into one third data element, wherein the data packets of the transmitting devices form the packet when merged.

In an embodiment of this method the first device controls the transmission of the transmitting devices, and the first device forwards the data packet to at least one device in the data network, independent of the transmitting device or devices. As a result the method, the software or the device can be deployed in an organic network as described in Dutch patent 1017388.

Additionally the invention relates to a method for receiving a packet of digital data, wherein a receiving device provided with data storage means creates a data buffer in the data storage means the size of a packet of digital data to be received, and after that almost simultaneously receives a first flow, a second flow, and at least one third flow of data elements, wherein the receiving device fills the data buffer from front to rear with the first flow of data elements and fills the data buffer from rear to front with the second flow of data elements, and fills the data buffer from the middle to the front and to the rear with the third flow of data elements.

In an embodiment of this method the receiving device makes it known to transmitting devices of the flows of data elements when the front or rear half of the data buffer is full and the quantity of data of the third flow and the flow that does not fill the data buffer halfway yet together are sufficient to fill the other half of the data buffer.

Additionally the invention relates to a method for sending a packet of digital data, wherein a device provided with data storage means creates a data buffer in the data storage means, stores the packet of digital data in the data buffer, converts each time a first data element from the rear part of the front subarea of the data buffer and a second data element from the front part of the rear subarea of the data buffer into one data element by means of a reversible operation, and transmits said data element.

In an embodiment of one of the methods described above for either receiving or sending a packet of digital data at least three flows of digital data are almost simultaneously received or sent, respectively.

A device for receiving according to the invention can furthermore comprise a duplicating module, adapted for duplicating a data element and writing each of the duplicated data elements to the memory module.

Additionally the invention relates to software for sending a packet of digital data according to a method described above, wherein the software is provided with:

a construction routine for retrieving two data elements from the memory means, one data element from the rear part of the front subarea of the packet, and one data element from the front part of the rear subarea of the packet, and converting said two data elements into one data element by means of a reversible operation;

a transmission routine for transmitting the wanted flow of data elements, and a stop routine for receiving and processing an instruction from a receiver of a flow of data elements to stop transmitting.

In an embodiment said software further comprises:

an instruction routine for receiving an instruction which of the flows of data elements has to be sent.

Preferably a device stops sending after receipt of a signal from the receiving device. As a result the coordination is again simple.

Additionally the invention relates to software provided with routines for carrying out the method according to one or more of the preceding claims. From the above description, in combination with the figures and their description, it will immediately be obvious to the expert which routines are necessary to that end, and how said routines have to work with respect to each other. Such software can of course be immediately implemented in hardware, for instance in a PROM, EPROM or the like, or entered into hardware, for instance at chip level in hardware logic.

Additionally the invention relates to a carrier provided with software as described.

Additionally the invention relates to a device, provided with software as described.

The invention is further elucidated on the basis of the figures that form exemplary embodiments of the invention. However, the invention is not limited to said exemplary embodiments.

DESCRIPTION OF EMBODIMENTS

Figure 1:
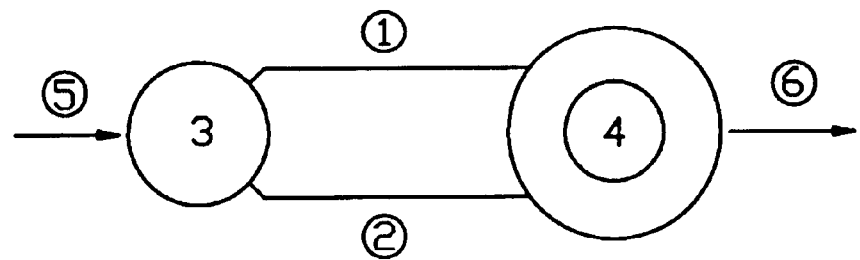
FIG. 1 the splitting of one signal into two signals and merging at the receiver, as described in Dutch patent 1017870.

FIG. 1 shows a situation as has also been described in Dutch patent 1017870, wherein a signal 5 conventionally enters a receiver 3. Receiver 3 splits the signal, or each data packet of which the signal has been built up, into two flows 1 and 2 to forward it to receiver 4. Flow 1 is the signal, sent from the front, that means the first bit of the data packet or the signal is sent first, then the second, etc. Flow 2 is the signal 5 or a data packet thereof, but then backwards, that means first the last bit is sent, then the penultimate one, etc. Thus there is question of complementary signals with which a complete data packet can be reconstructed.

Receiver 4 fills its data buffer simultaneously from the front with signal 1 and from the rear with signal 2. This can also take place by means of a computer program, but can also be implemented by way of hardware. When the buffer is full, that means the complete signal or data packet has been received, the receiver 4 sends a signal to transmitter/sender 3 that the buffer is full, that means that the signal has been received. It is of course also possible that receiver 4 keeps sending a signal to transmitter/sender 3 until the buffer is full, or just closes down the connection when the buffer is full, or sets a port at high or low.

Figure 2:
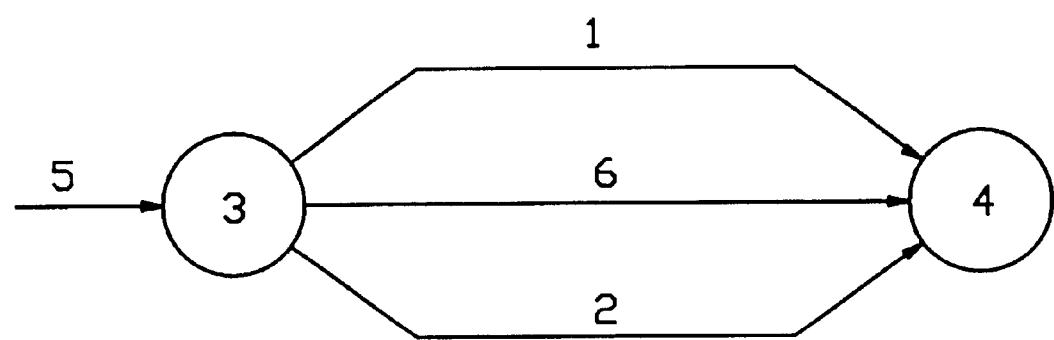
FIG. 2 the splitting of one signal into three signals and merging at the receiver.

In FIG. 2 almost the same situation is described as in FIG. 1, however, a third data flow or signal 6 is present according to the present invention. The complete signal or data packet can be reconstructed here when one of both other signals 1 or 2 has been completely received, that means that one half of the data has been received and the other two flows 1 or 2 together with 6 form the other half of the data or the packet of data. Whether the data of the three flows together are sufficient for reconstructing the packet of digital data, can also be used as criterion. This is further elucidated in among others FIGS. 5A–5D.

Figure 3:
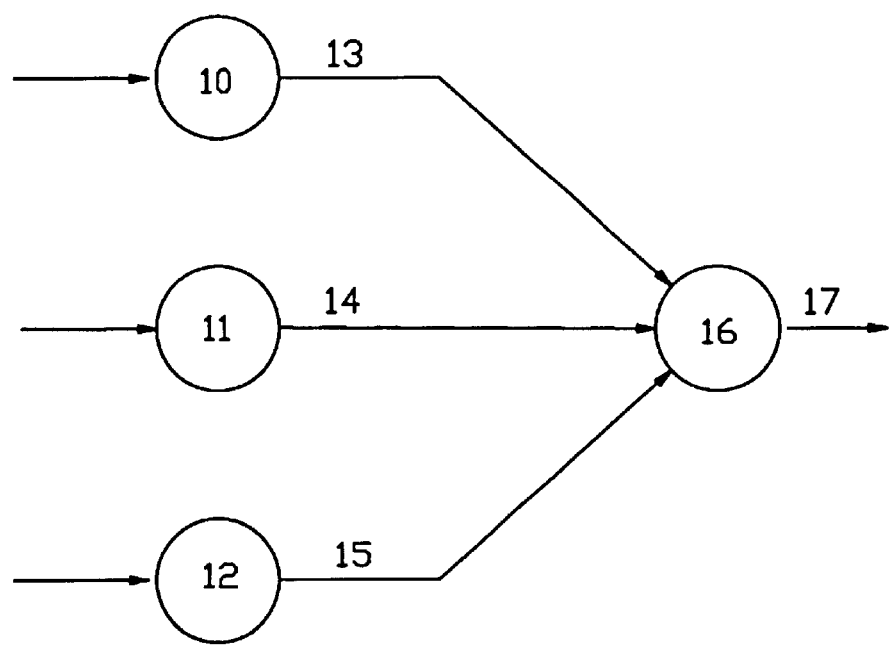
FIG. 3 the receiving of a split signal by a receiver from three physically separated sources, FIG. 4 the splitting of one signal into three flows to three physically separated receivers, that exchange signals one to the other in order to obtain the complete signal.

In FIG. 3 a possible situation is shown in which a first, second and third device (10, 11, 12) send flows of data 13, 14 and 15, respectively, to a fourth device 16. Device 16 reconstructs the original signal or the original data flow, and forwards it as data flow 17. This may for instance be advantageous when the receiving capacity of device 16 is larger or equal to the common transmission capacity of 10, 11 and 12. An even larger advantage is created when the transmission capacity of 16 is larger than the transmission capacity of 10, 11 or 12. After all a flow 17 is thus obtained that has a larger speed than the three separate flows 13, 14 and 15.

Figure 4:
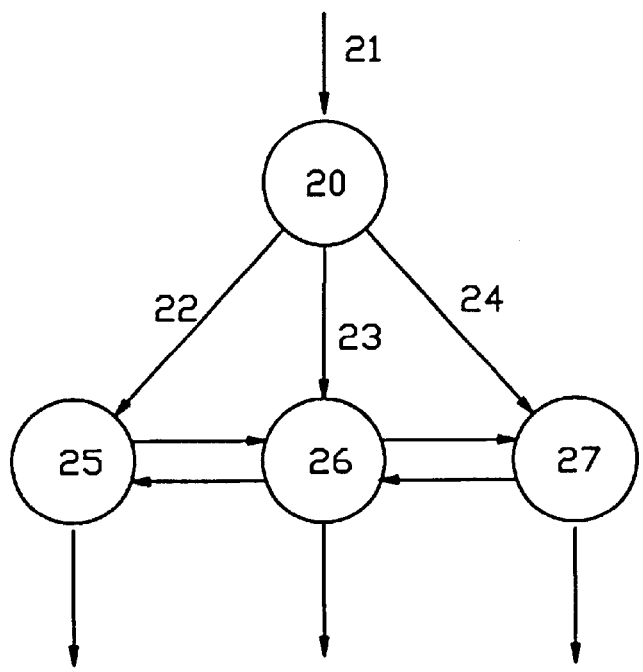

FIG. 4 shows an embodiment wherein a first device 20 receives a data flow 21. Said flow is split in three separate flows 22, 23 and 24 to devices 25, 26 and 27, respectively. Said devices forward their received data to each other. This is possible in various ways. Shown is and option wherein 25 exchanges with 26 and 26 with 27. It is also possible that all three devices 25, 26 and 27 exchange one with the other. The three devices can all three of them forward the data again, as a result of which effectively a transmission capacity is achieved that is three times as large.

FIGS. 5A–5D shows an embodiment of the operation of the invention. Here for the sake of ease a situation is shown in which one device 30 sends three flows A, B and C and one device 31 receives three flows A, B and C (as is also the case in FIGS. 6A–C and 7A–B).

The transmitting device 30 is provided with a data buffer 32 provided with n data elements 1 . . . n. Said data elements may for instance be little data packets, bits or bytes. Flow A consists of data elements that are consecutively are retrieved from the data buffer 32 according to the sequence indicated with direction a. Flow C consists of data elements that are consecutively retrieved from the data buffer 32 according to the sequence indicated by direction c. Flow B arises as a result of data elements that are consecutively retrieved from the data buffer according to the sequence indicated by the direction b, and data elements that are retrieved from the data buffer according to the sequence that is indicated by the direction b'. Two data elements in this case are subjected to an XOR operation 33 resulting in one output data element. In this way a flow B is created. In the figure it is indicated that the data elements are retrieved from the middle 34 towards the ends of the data buffer. It is possible in some situations however, that the flow B does not start exactly from the middle. The advantage of the flow B starting exactly in the middle is that no extra data have to be sent or tallied.

Figure 5A:
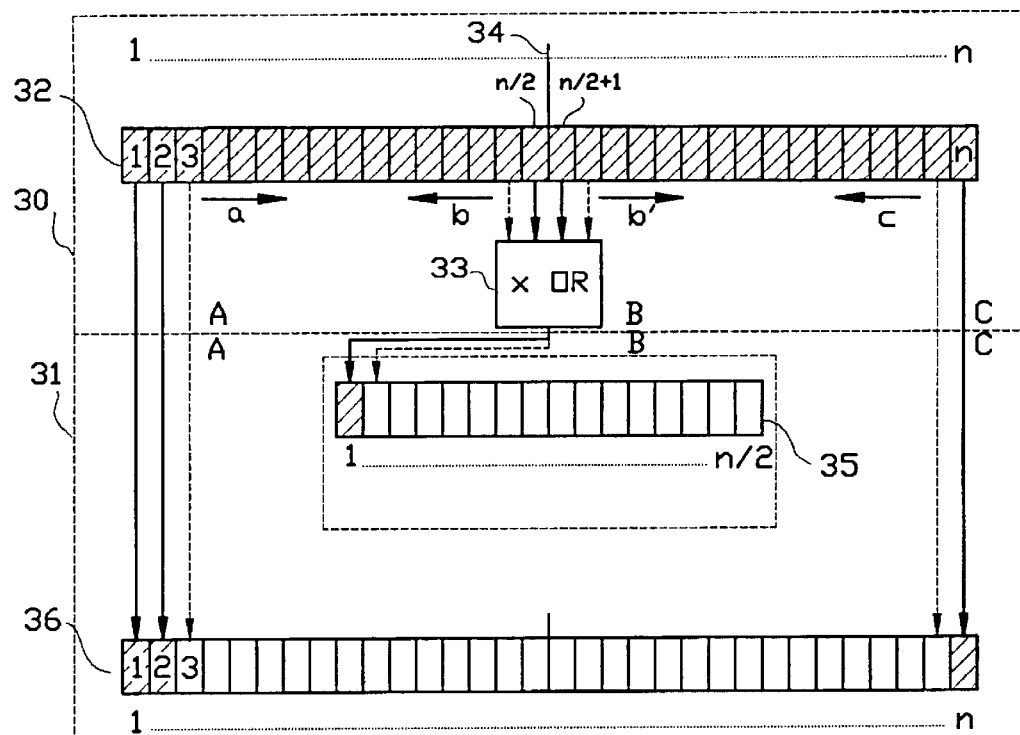
FIGS. 5A–5D the sending of a packet of digital data via three flows and the receiving and reconstructing via two data buffers, FIGS. 6A–6C the sending of a packet of digital data via three flows and the receiving and reconstructing via two data buffers, FIGS. 7A–7B the sending of a packet of digital data via three flows and the receiving and reconstructing via one data buffer, FIG. 8 consecutive steps in filling one data buffer.
Figure 5B:
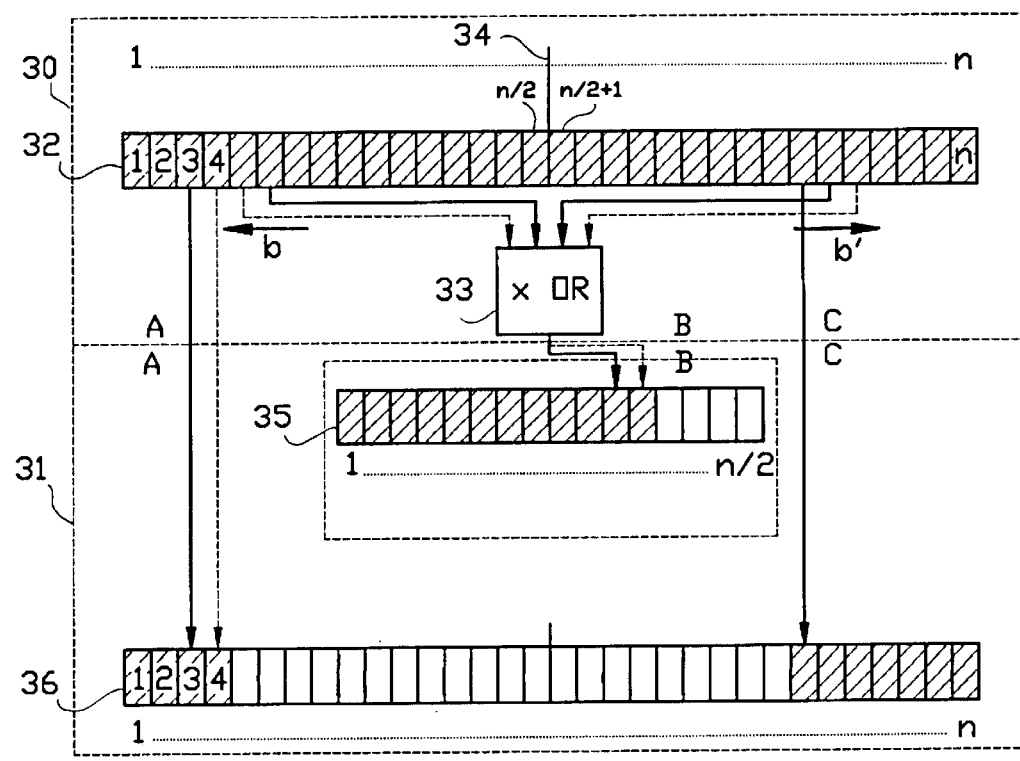

The receiving device in this example comprises two data buffers, data packet buffer 36 that may contain n data elements, and an auxiliary data buffer 35 that may contain n/2 data elements. The incoming flow A fills data packet buffer 36 from front to rear and flow C fills data packet buffer 36 from rear to front. Sofar the method is the same as the one described in Dutch patent 1017870. The incoming flow B fills the auxiliary data buffer 35 from front to rear. In FIG. 5B said progress is shown. In this example 3 data elements are sent via flow A and number 4 starts (dotted line), 7 data elements are sent via flow C and via flow B 11 data elements and number 12 starts (dotted line).

Figure 5C:
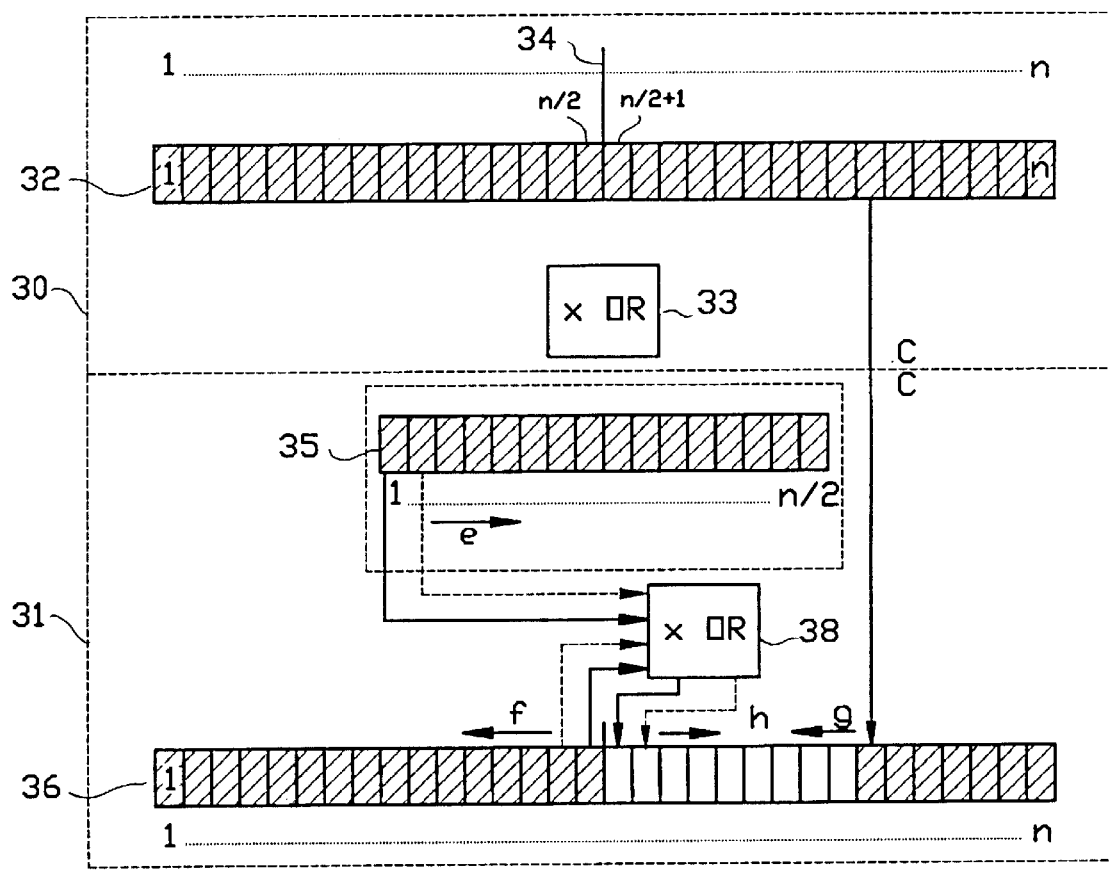

In FIG. 5C it is indicated that flow A has stopped because half of the data elements have been sent. Flow B has also stopped because auxiliary data buffer 35 is full. Meanwhile flow C in this case continues, but said flow might stop now already, because from the front half of the data in data packet buffer 36 and auxiliary data buffer 35 the data from the rear half of the data packet buffer 36 can be reconstructed in the manner as indicated in FIG. 5C. Each time one data element from auxiliary data buffer 35 and one data elements from data packet buffer 36 are converted by means of an XOR operation into one data element corresponding to a data element of the original packet of digital data. In the figure it is indicated that the data elements are processed via the fixed lines, and after that the data elements with the dotted lines. Successively the data elements according to the sequence indicated by arrow e are retrieved one by one from the auxiliary data buffer 35 and supplied to XOR operation device (or XOR operator) 38. In addition each time one data element is simultaneously copied from the middle towards the front according to the direction indicated by arrow f from the data packet buffer 36 and also supplied to XOR operation device 38. The output of the XOR operation device 38 is an original data element of the original packet of data that is placed in the data packet buffer 36, from the middle of the data packet buffer towards the rear, according to the direction indicated by arrow h. As a result the complete data packet buffer 36 is filled and the original packet of data is reconstructed.

Figure 5D:
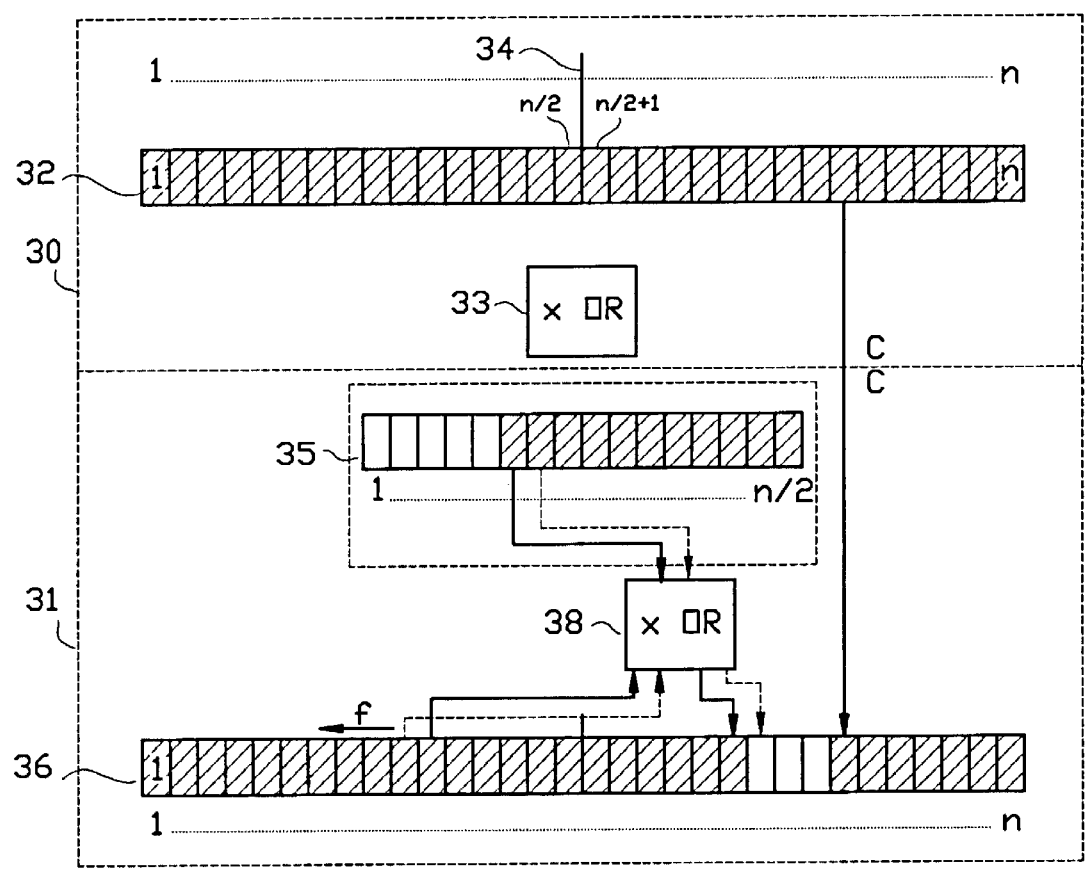

In FIG. 5D the situation is shown wherein almost the entire data packet buffer 36 is filled. In practice the flow C, that still continues here, can already be stopped when flow A has been completely received, in this case n/2 data elements large, and the number of data elements of flow B and C together are equal to the remaining part of the data elements, in this case n/2. Another possibility, when one of the flows A or C is very fast, is to let the fast flow continue beyond the middle, and to stop when the sum of the data elements of the three flows together is n data elements.

Figure 6A:
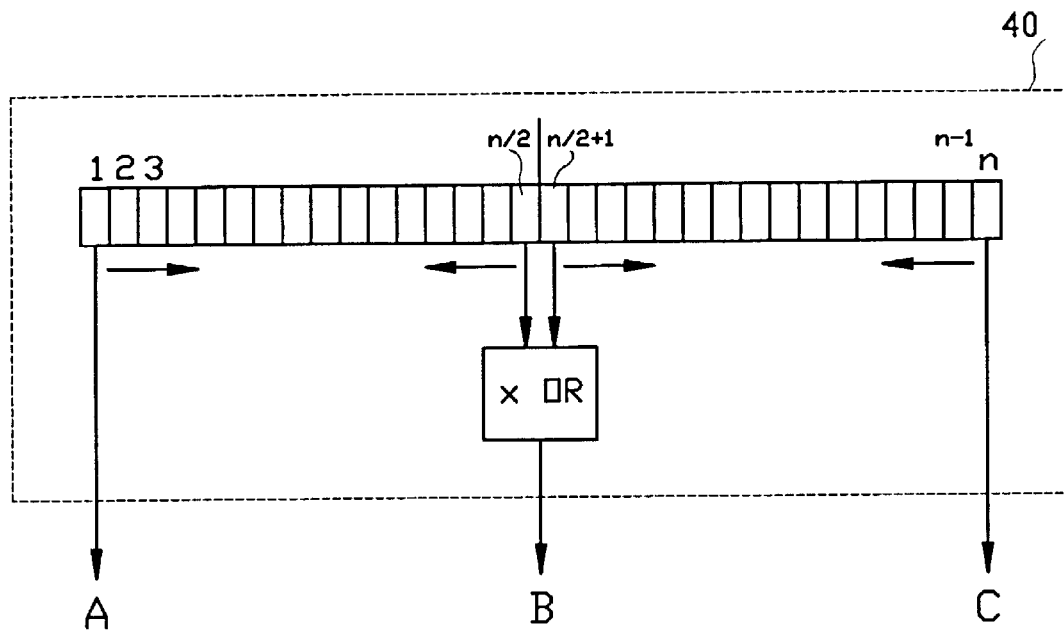
Figure 6A:
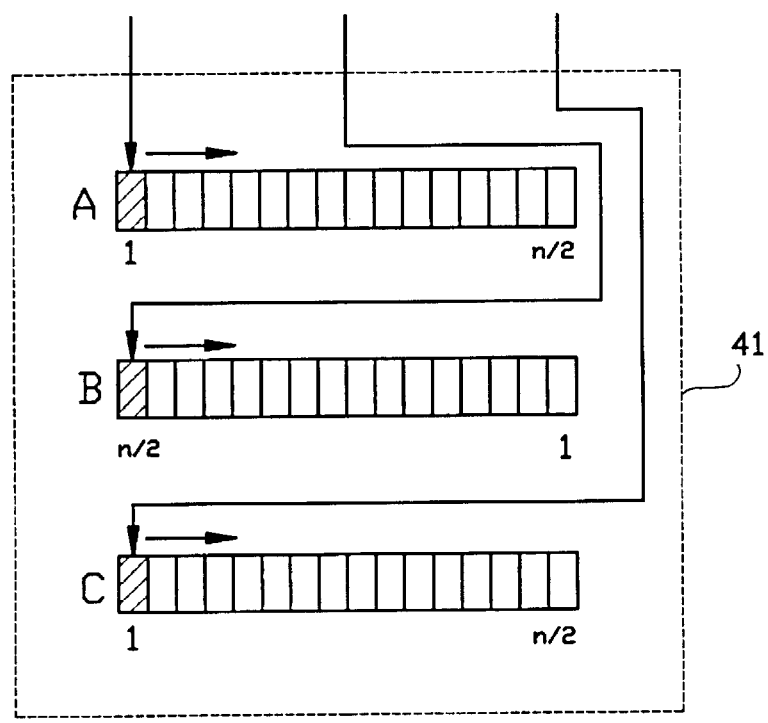

In FIG. 6A the situation is shown wherein at the receiving side 41 use is made of three data buffers A, B and C. From the transmitting side three data flows A, B and C are running, which at the receiving side are put in the data buffers A, B and C, respectively. In this example said receiving buffers are n/2 data elements large. An advantage of making use of three data buffers is that checking is easy. When a buffer is full sending the flow that fills the buffer can be stopped with. Also when a buffer is full, the flow that filled the now full buffer can be diverted and fill another buffer from another side than from where an existing flow already fills it.

Figure 6B:
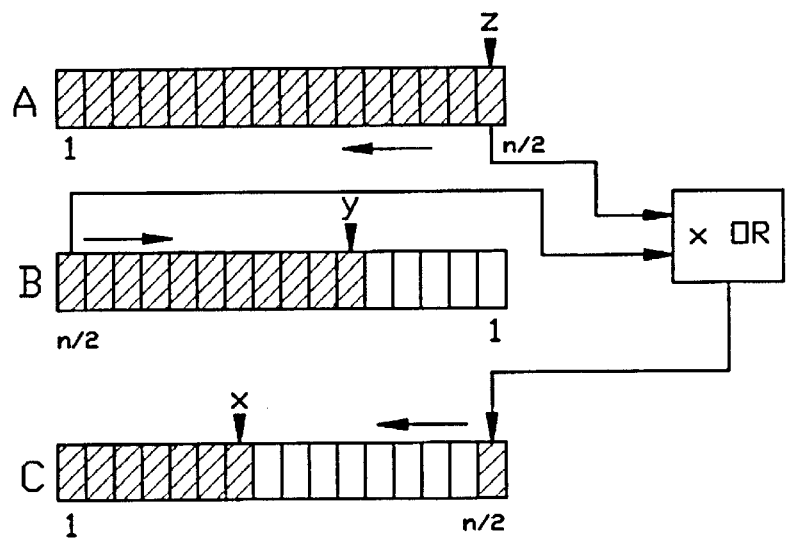

In FIG. 6B it is indicated how reconstruction can take place. In this case data buffer A was full first. Pointer z indicates where the last data elements stands. In the other buffers the position of the last data element is indicated by pointers x and y, respectively. By means of the data that are already present in the data buffer B data buffer C can be filled from rear to front. To that end a data element can be retrieved from the rear of data buffer A and from the front of data buffer B (which can of course also be from the rear when the data buffer B has been filled from the rear). The two data elements are supplied to an XOR operator and converted into a data element that can be placed in data buffer C. In this way data buffer C is in this case filled from two sides. When it appears that the quantity of data in data buffer B and in data buffer C together are sufficient to completely fill data buffer C, the data flows B and C to data buffer C and B, respectively, can stop, as has also been indicated in FIG. 6B. It is also possible, when one buffer A or C is full, to divert the further flow to that buffer to buffer C or A, respectively. This can be stopped when the sum of the data elements together is n.

Figure 6C:
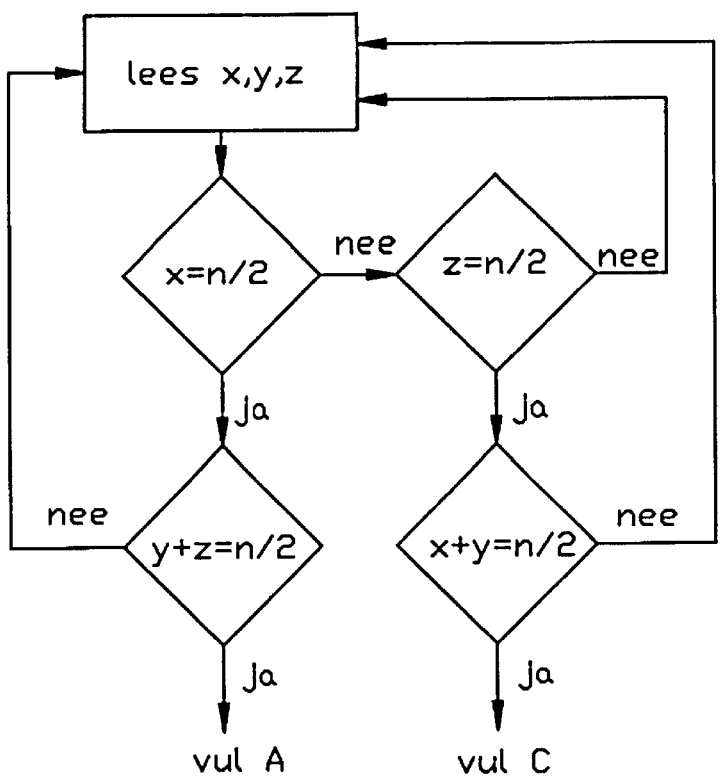

In FIG. 6C a flow chart is shown of a check algorithm for a situation as depicted in FIGS. 6A and 6B for the receiving side to determine whether the transmission of data can already be stopped. In FIG. 6B pointers x, y and z are indicated that tally where the data received have to be placed. On the basis of the algorithm it is determined which data buffer is not full yet, and whether the contents of the other two data buffers is sufficient to completely fill the data buffer A or C that is not completely filled yet.

Figure 7A:
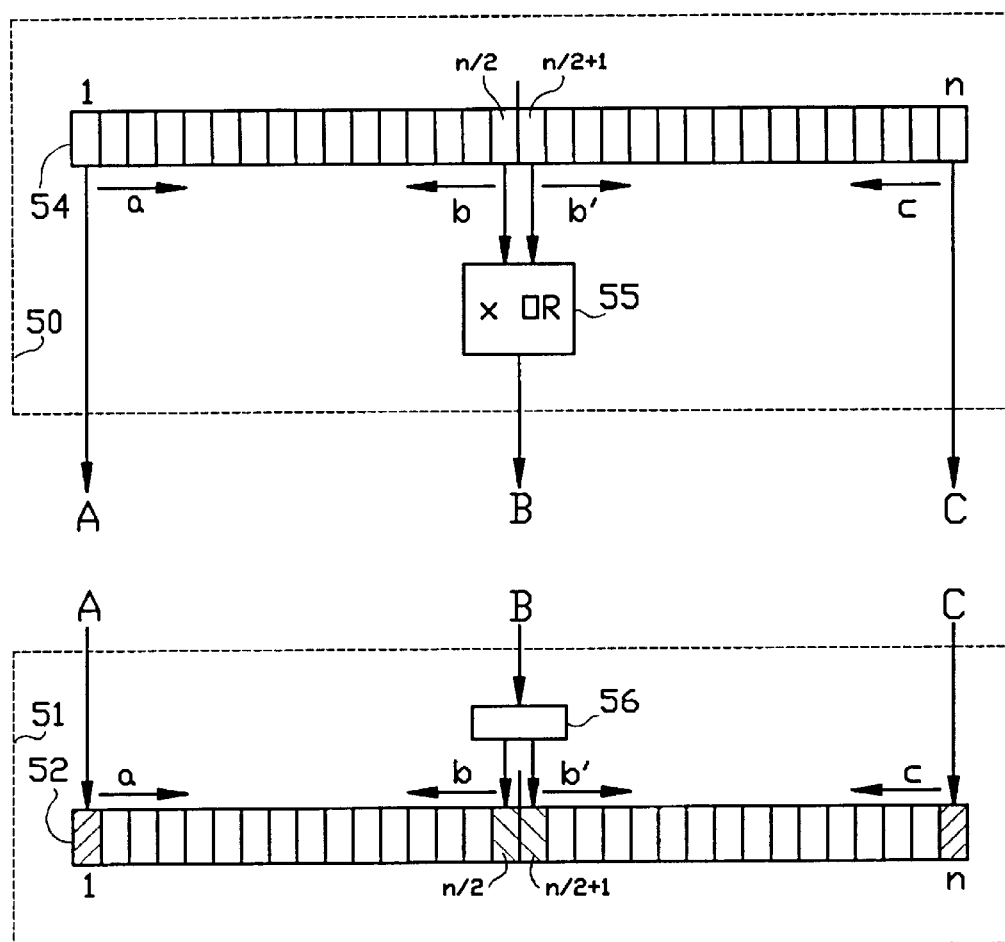
Figure 7B:
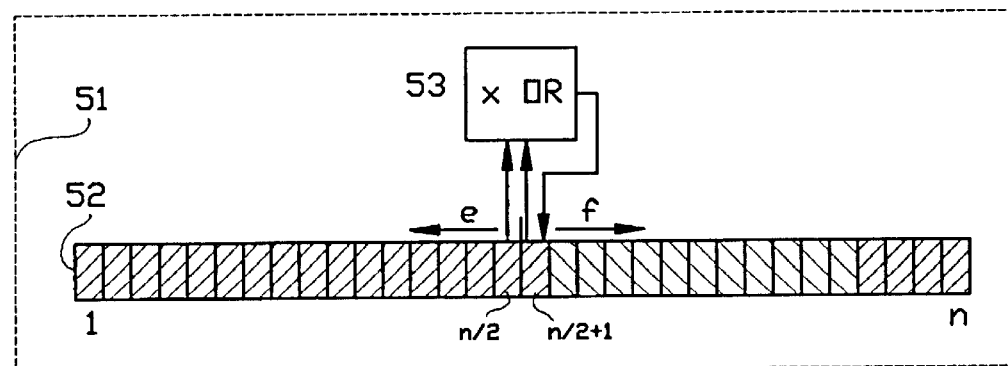

In FIGS. 7A–7B an embodiment is shown wherein at the receiving device 51 use is made of one data buffer 52. The transmitting device 50 is provided with a data buffer 54 and an XOR operator 55, the receiving device 52 is also provided with a data buffer 52 and an XOR operator 53. Additionally the receiving device 51 is provided with a duplicator 56 to place the data of data flow B on two positions in the data buffer 52.

The operation is as follows. Via the data flow A data are sent, wherein the data buffer 54 is read in the direction a. Via the data flow C the data are sent, wherein the data buffer 54 is read in the direction c, and two flows of data that from the middle in the direction b and b' comprise data from the data buffer 54 are led to the XOR operator 55, where each time two data elements are converted into one data element that is sent via data flow B.

In the receiving device 51 data flows enter via receiving means. The data elements of data flow A are put in the data buffer 52 from the front towards the rear in the direction a. The data elements of flow C are put in data buffer 52 from the rear towards the front in the direction c. The data elements of data flow B are duplicated by means of duplicator 56 and put in the data buffer 52 from the middle in the direction b and b'. When the data buffer 52 is full, wherein at least one half (either the front or rear half) is filled with data from data flow A or C, the reconstruction of the other data elements can begin as indicated in FIG. 7B. In principle the data flows can stop then. Two data elements that are symmetrically situated with respect to the middle of the data buffer 52 are read and supplied to an XOR operator. The result is, starting from the middle, entered into the data buffer 52. Subsequently the next data elements in the direction e and f are read and written to the right-hand side of the data buffer. This can be seen by means of the hatched lines.

In various figures each time a transmitting device is shown having three outgoing data flows. In practice however there will generally be three separate transmitting devices that each ensure one of the data flows.

According to the invention it may be so that right at the beginning, at the start of transmission, it appears that one of the three flows is insufficient to contribute to the reception. It can then be decided to continue with two of the three flows. It is possible that this is not geared with the transmitting device. In fact in this boundary case the third flow is present only a little while, and it may therefore occur that the third flow does not contribute to the overall transmission of the data at all.

For that matter the method according to the invention may for instance be used in GSM or other cordless telephony. In that case a conversation or a data flow can be divided into little packets which can be sent in accordance to the method according to the invention. Use can also be made of the available band width: each data flow can be sent over another band, so that optimal use can be made of the available band width. It is also possible to send different flows over different frequencies.

The devices described can be (personal) computers or PDA's that are connected to each other via the internet or an intranet. In those cases the data packet can be a data file or internet page, but also a streaming audio or video broadcast. The device can also be an (intelligent) television which via a data connection downloads a film or the like.

The methods, devices and software as described above can very well be deployed in organic data networks such as extensively described in Dutch patent 1017388. Especially because the devices described in that patent forward data independent from a transmission device, the method described has advantages because no complicated control platform is necessary.

Figure 8:
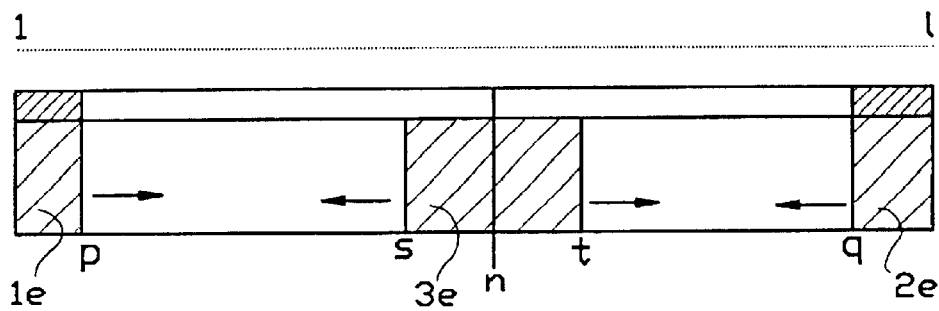
Figure 8:
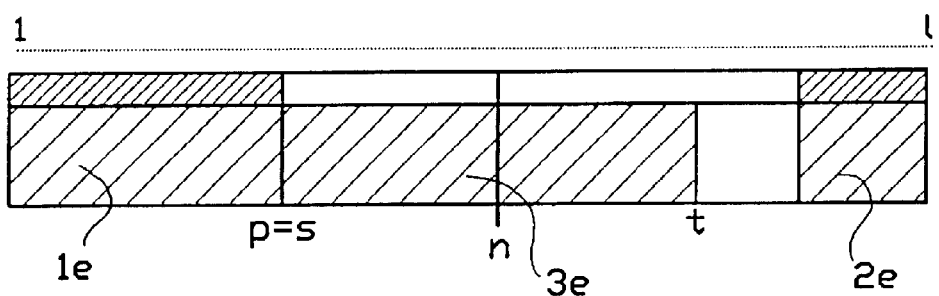
Figure 8:
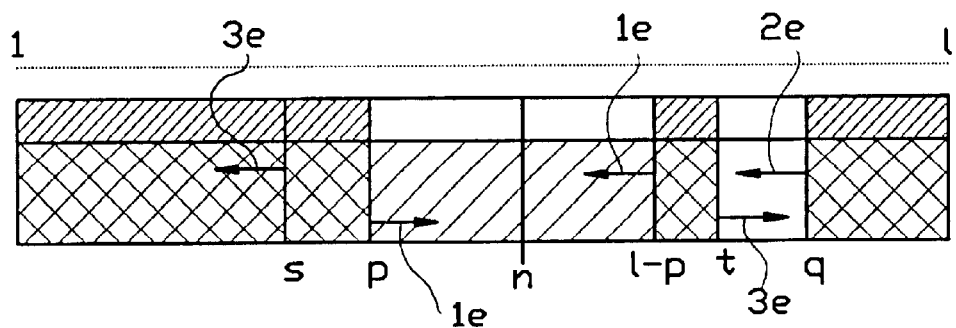

A possible set of decision rules is also shown below. In FIG. 8 the consecutive steps are shown.

---

Variables:

a    true if 1st flow active
b    true if 2nd flow active
c    true if 3rd flow active
p    position 1st flow in the buffer
q    position 2nd flow in the buffer
s    position 3rd flow in the buffer
t    complementary position 3rd flow in the buffer
l    length buffer
n    length half of the buffer (½)
D    data buffer
R    data element to be written
Write action 1st flow:

p = p + 1
D[p] = R
If p = q then stop all        buffer full
If q = n and p = s then stop 1st flow
If c true and p >= s then
   If p =< n then D[l-p] = D [l-q] xor R else stop 1st flow
   If l - p > q then stop 1st and 3rd flow
Write action 2nd flow:

q = q + 1
D[q] = R

-continued

If p = q then stop all        buffer full
If p = n and q = t then stop 2nd flow
If c true and t >= q then
   If p >= n then D[l-q] = D [l-q] xor R else stop 2nd flow
   If 1 - q > p then stop 2nd and 3rd flow
Write 3rd flow s = s - 1
t = t + 1
If p >= s and q >= t then stop 3rd flow     3rd flow ready
If p < s then D[s] = R else D[s] = R xor D[t]
If q < t then D[t] = R else D[t] = R xor D[s]
If c is not true xor flow does not run and one should wait until the buffer is full (p = q)

We claim:

1. A method for digital inverse multiplexing digital data comprising:
    splitting a packet of digital data into:
        a first flow wherein the packet of digital data is sent from front to rear;
        a second flow wherein the packet of digital data is sent from rear to front; and
        a third flow, said third flow including a flow of data elements obtained from each time that a first data element from a rear part of a front sub-area of the packet of digital data and a second data element from a front part of a rear sub-area of the packet of digital data are reduced into a third data element by means of a reversible operation.

2. The method according to claim 1, wherein consecutive first data elements from the rear part of the front sub-area are selected from rear to front.

3. The method according to claim 1, wherein consecutive second data elements from the front part of the rear sub-area are selected from front to rear.

4. The method according to claim 2, wherein consecutive second data elements from the front part of the rear sub-area are selected from front to rear.

5. The method according to claim 2, wherein each time an immediately following data element is selected.

6. The method according to claim 3, wherein each time an immediately following data element is selected.

7. The method according to claim 4, wherein each time an immediately following data element is selected.

8. Method according to claim 7, wherein the packet of digital data, can be supplemented to a packet that can be split into two parts, wherein said two parts are equal sized parts.

9. The method according to claim 1, in which the first and second data elements are bits of the packet of digital data, and the third data element is a result of a single binary operation.

10. The method according to claim 9, wherein the single binary operation is an XOR operation on the first data element and the second data element.

11. The method according to claim 1, wherein the data elements of the first, second and third flow, respectively, are placed in a first, second and third data buffer, respectively.

12. The method according to claim 11, wherein each of the data buffers have the size of half the packet of digital data.

13. The method according to claim 1, wherein the data elements of the first, second and third flow, respectively, are placed in one data buffer having the size of the packet of digital data.

14. The method according to claim 13, wherein the first flow fills the data buffer from front to rear, the second flow fills the data buffer from rear to front, and the third flow is duplicated, wherein one duplicated flow fills the data buffer from the middle to the front, and the other duplicated flow fills the data buffer from the middle to the rear.

15. The method according to claim 1, wherein the data elements of the first and second flow are placed in a first data buffer, wherein the first flow fills the data buffer from front to rear, and the second flow fills the data buffer from rear to front, and the data elements of the third flow are placed in a second data buffer.

16. The method according to claim 11, wherein either the first or the second flow overwrite data elements already present in the data buffer originating from the third flow.

17. The method according to claim 13, wherein either the first or the second flow overwrite data elements already present in the data buffer originating from the third flow.

18. The method according to claim 15, wherein either the first or the second flow overwrite data elements already present in the data buffer originating from the third flow.

19. The method according to claim 1, wherein one of a first, a second and a third device, respectively, sends the first, second and third flow, respectively.

20. The method according to claim 19, wherein a fourth device sends a signal to the first, second and third device when one of the data buffer is full and the respective data buffers are full, and the fourth device stops sending receipt confirmations when one of the data buffer is full and the respective data buffers are full.

21. The method according to claim 1, wherein the flows are substantially sent simultaneously.

22. The method according to claim 1, wherein a transmitting device sends the first, second and third flow to a first, second and a third receiving device, respectively, and wherein the first, second and third receiving device forward their respective flows to the other two receiving devices.

23. A method for digital inverse multiplexing digital data comprising:
   splitting a packet of digital data into:
      a first flow wherein the packet of digital data is sent from front to rear;
      a second flow wherein the packet of digital data is sent from rear to front, and
      a third flow, including a flow of data elements obtained from each time that a first data element from a rear part of a front sub-area of the packet of digital data and a second data element from a front part of a rear sub-area of the packet of digital data are reduced into a third data element by means of a reversible operation,
   wherein consecutive first data elements from the rear part of the front sub-area are selected from rear to front,
   wherein consecutive second data elements from the front part of the rear sub-area are selected from front to rear,
   wherein each time an immediately following data element is selected, and
   wherein the packet of digital data, can be supplemented to a packet that can be split into two parts, wherein said two parts are split into equal sized parts.

24. The method according to claim 23, in which the first and second data elements are bits of the packet of digital data, and the third data element is the result of a single binary operation.

25. The method according to claim 24, wherein the single binary operation is an XOR operation on the first data element and the second data element.

26. The method according to claim 23, wherein the flows are substantially sent simultaneously.

27. A method for sending a packet of digital data to a first device in an organic data network comprising:
   simultaneously sending complementary data packets from at least two transmitting devices in the organic data network to the first device,
   sending data packets from a third transmitting data device to the first device,
   wherein the data packets have been obtained from each time a first data element from a rear part of a front sub-area of the packet of digital data and the second data element from a front part of a rear sub-area of the packet of digital data which by means of a reversible operation have been reduced into a third data element,
   wherein the data packets of the transmitting devices form the packet of digital data when merged.

28. The method according to claim 27, wherein the first device controls transmission of the transmitting devices, and the first device forwards the packet of digital data to at least one device in the data network, independent of the transmitting device or devices.

29. The method according to claim 28, wherein at least three flows of digital data are sent substantially simultaneously.

30. A method for receiving a packet of digital data comprising:
   creating a data buffer in a receiving device having a data storage means, said data storage means having a size of a packet of digital data to be received,
   receiving a first flow, a second flow, and at least one third flow of data elements, the receiving device fills the data buffer from front to rear with the first flow of data elements and fills the data buffer from rear to front with the second flow of data elements, and fills the data buffer from the middle to the front and to the rear with the third flow of data elements, wherein said receiving the first flow, the second flow and the at least one third flow is substantially simultaneous.

31. The method according to claim 30, wherein the receiving device makes it known to the transmitting device of the flows of data elements when the front or rear half of the data buffer is full and the quantity of data of the third flow and the flow that does not fill the data buffer halfway yet together are sufficient to fill the other half of the data buffer.

32. The method according to claim 30, wherein at least three flows of digital data are sent substantially simultaneously.

33. A method for sending a packet of digital data comprising:
   creating a data buffer by a device having a data storage means, said data buffer is created in the data storage means,
   storing the packet of digital data in the data buffer,
   converting each time a first data element from a rear part of a front sub-area of the data buffer and a second data element form a front part of a rear sub-area of the data buffer into one data element by means of a reversible operation, and
   transmitting said data element.

34. The method according to claim 33, wherein at least three flows of digital data are sent substantially simultaneously.

35. A device for sending a packet of digital data including data elements, comprising:
   a transmission module, adapted for transmitting the data elements;

a memory module, adapted for storage of the packet of digital data;

a reading module, adapted for reading each time two data elements form two parts of the memory module, one data element form a rear part of a front sub-area of the packet of digital data, and one data element from a front part of a rear sub-area of the packet of digital data;

an operator, adapted for converting said two data elements into one data element to be transmitted, and a construction module, adapted for receiving the data elements of the reading module, supplying the data elements to the operator, and receiving a resulting data element from the operator and supplying the resulting data element to the transmission module.

36. A device for receiving a packet of digital data including data elements, comprising:

a receiving module, adapted for receiving at least three flows of data elements;

a memory module, adapted for storage of the data elements;

an operator, adapted for converting two data elements into one resulting data element;

a counting module, adapted for tallying the quantity of data elements that have been received form each flow;

a decision module, adapted for determining whether all data elements that are necessary for reconstructing the complete packet of digital data are present and to determine which part of the packet of digital data has to be determined by means of reconstruction, and a reconstruction module for retrieving each time two data elements from the memory means, which is connected to the operator for supplying said data elements to the operator, discharging the resulting data element of the operator and writing the resulting data element to the memory module.

37. The device according to claim 36, further comprising a duplicating module, adapted for duplicating a data element and writing each of the duplicated data elements to the memory module.

38. An apparatus comprising a machine-readable medium containing instructions which, when executed by a machine, cause the machine to perform operations comprising:

splitting a packet of digital data into:

a first flow wherein the packet of digital data is sent from front to rear;

a second flow wherein the packet of digital data is sent from rear to front; and a third flow, said third flow including a flow of data elements obtained from each time that a first data element from a rear part of a front sub-area of the packet of digital data and a second data element from a front part of a rear sub-area of the packet of digital data are reduced into a third data element by means of a reversible operation;

sending from a transmitting device the first, second and third flow to a first, second and a third receiving device, respectively, and wherein the first, second and third receiving device forward their respective flows to the other two receiving devices;

retrieving two data elements from a memory means, one data element from the rear part of the front sub-area of the packet of digital data, and one data element from the front part of the rear sub-area of the packet of digital data, converting said two data elements into one data element by means of a reversible operation;

transmitting a wanted flow of data elements, and receiving and processing an instruction from a receiver of a flow of data elements to stop transmitting.

39. The apparatus of claim 38, further containing instructions which, when executed by a machine, cause the machine to perform operations including:

receiving an instruction for which of the flows of data elements has to be sent.

40. An apparatus comprising a machine-readable medium containing instructions which, when executed by a machine, cause the machine to perform operations comprising:

creating a data buffer by a device having a data storage means, said data buffer is created in the data storage means, storing the packet of digital data in the data buffer, retrieving two data elements from said data storage means, one data element from the rear part of the front sub-area of the packet of digital data, and one data element from the front part of the rear sub-area of the packet of digital data, converting each time a first data element from a rear part of a front sub-area of the data buffer and a second data element form a front part of a rear sub-area of the data buffer into one data element by means of a reversible operation, transmitting said one data element, transmitting a wanted flow of data elements, and receiving and processing an instruction from a receiver of a flow of data elements to stop transmitting.

41. An apparatus comprising a machine-readable medium containing instructions which, when executed by a machine, cause the machine to perform operations comprising:

receiving a packet of digital data that is sent in at least three flows of data elements;

writing the data elements of the flows of data elements to a memory means;

tallying the quantity of data elements that have been received form each flow;

determining whether all data elements that are necessary for reconstructing the complete packet of digital data are present and to determine which part of the packet has to be determined by means of reconstruction;

converting two data elements into one resulting data element using a reversible operation by an operator, and retrieving each time two data elements from the memory means, for supplying said data elements to an operator, for discharging the resulting data element from the operator; and writing the resulting data element to the memory means.

42. The apparatus of claim 41, further containing instructions which, when executed by a machine, cause the machine to perform operations including:

transmitting a message to a source of one of the flows of data elements for stopping said flow.

43. The apparatus of claim 38, wherein said reversible operation is an XOR operation.

44. The apparatus of claim 43, wherein said apparatus is a carrier.

45. A method comprising:

transmitting a packet of digital data that has been built up from data elements in three separate flows, wherein the packet of digital data is split into two complementary flows of data and a third flow of data elements that have been built up from the data elements from the packet of digital data from data that are in turn complementary to the data form the other two flows.

* * * * *